United States Patent [19]
Thorson

[11] Patent Number: 6,101,225
[45] Date of Patent: Aug. 8, 2000

[54] METHOD AND APPARATUS FOR PERFORMING A MODULATION

[75] Inventor: Dean Ernest Thorson, Hoffman Estates, Ill.

[73] Assignee: Motorola, Inc., Schaumburg, Ill.

[21] Appl. No.: 09/069,670

[22] Filed: Apr. 29, 1998

[51] Int. Cl.[7] .................................................. H04L 27/00
[52] U.S. Cl. .......................... 375/308; 375/260; 375/261; 375/296
[58] Field of Search ..................................... 375/308, 260, 375/261, 296; 332/103

[56] References Cited

U.S. PATENT DOCUMENTS

| | | | |
|---|---|---|---|
| 5,373,532 | 12/1994 | Fujita et al. | 375/308 |
| 5,715,280 | 2/1998 | Sandberg et al. | 375/260 |
| 5,844,943 | 12/1998 | Kazecki et al. | 375/261 |
| 5,847,619 | 12/1998 | Kirisawa | 332/103 |

*Primary Examiner*—Stephen Chin
*Assistant Examiner*—Shuwang Liu
*Attorney, Agent, or Firm*—Kenneth A. Haas

[57] ABSTRACT

A method and apparatus for producing phase reference signals for use in a quadrature modulation circuit are disclosed. The quadrature modulation circuit includes a signal splitter (130), a first and second signal conditioning circuit (104, 106), a local oscillator (126) and a combiner (128). The method includes generating a first and second phase reference signal (111, 113) by the local oscillator. The method also includes providing a first and second sign information signal (225, 223) to a corresponding first and second phase modulator (240, 242). Finally, the method includes modulating the first phase reference signal (111) by the first phase modulator (240) to produce a first modulated phase reference signal (131), and modulating the second phase reference signal (113) by the second phase modulator (242) to produce a second phase modulated reference signal (133). The phase modulated reference signals (131, 133) are then amplitude modulated and combined for subsequent transmission.

8 Claims, 4 Drawing Sheets

FIG.1 —PRIOR ART—

METHOD AND APPARATUS FOR PERFORMING A MODULATION

FIELD OF THE INVENTION

The present invention relates generally to modulation and, in particular, to a method and apparatus for performing a modified quadrature modulation of a digital signal.

BACKGROUND OF THE INVENTION

In many applications, traditional digital modulation schemes provide adequate performance. However, there exists other applications for which modulations having greater flexibility and sophistication are absolutely essential. Digital modulation techniques which yield the needed greater flexibility, require the use of digital-to-analog converters with large bandwidth capability. An example of an application requiring increased flexibility may be a satellite channel over which it is desired to simultaneously send two independent and generically different types of information. In this instance, a modulation scheme capable of handling two asynchronous data streams, with different rates, different powers and different formats, would be required. Another example of an application requiring increased flexibility to accommodate increased sample rates and bandwidths is a direct sequence code division multiple access (DS-CDMA) cellular communication system, such as set forth in the Telecommunications Industry Association Interim Standard 95A (TIA/EIA IS-95A) herein after referred to as IS-95A. In accordance with IS-95A, the coded communication signals used in the DS-CDMA system comprise signals that are transmitted in a common 1.25 MHz bandwidth, hence, spread-spectrum, to base sites of the system from communication units, such as mobile or portable radiotelephones, that are communicating in the coverage areas of the base sites. Each 1.25 MHz bandwidth portion of the radio-frequency (RF) spectrum is commonly referred to as a carrier frequency, capable of conveying multiple sync, paging and digital voice channels associated with a CDMA communication signal.

Complex digital modulation schemes, such as those required in a DS-CDMA system, require the transmitter to be implemented using quadrature modulation techniques. Quadrature modulation circuits are known in the art. Quadrature modulation circuits utilize two digitally encoded data streams to amplitude modulate independently, a sine and cosine component of a carrier signal. The two digitally encoded data streams are referred to as an in-phase (I) signal and a quadrature (Q) phase signal. The I signal mathematically represents a real component of the baseband version of the final resultant modulated signal while the Q signal mathematically represents an imaginary component of the baseband version of the final resultant modulated signal. The sum of the I and Q signal results in the creation of a unique set of two-dimensional signal vectors or symbols.

In a DS-CDMA transmitter which utilizes the quadrature modulation technique, the in-phase (I) and quadrature (Q) phase component signals are used to amplitude-modulate the sine and cosine components of a carrier signal generated by a local oscillator as follows. First the in-phase (I) and quadrature (Q) phase signals are converted into amplitude samples, N bits wide, via corresponding amplitude converters. Next, two digital-to-analog (D/A) converters are utilized to convert the I and Q digital amplitude samples into corresponding analog signals which are input to corresponding signal conditioning circuits and then used to amplitude modulate the sine and cosine components of the carrier signal. The ultimate goal is to transmit an error-free signal. Obviously, optimum quadrature modulation performance is obtained via D/A signal conversion across a large bandwidth. The need for a large bandwidth capacity combined with the desire to generate an error free signal requires the use of D/A converters with a high bit resolution capable of accommodating the high sample rates and bandwidths associated with wide-band cellular systems such as DS-CDMA. Unfortunately, the cost of the wide-band D/A converters are exponentially proportional to their required bit resolution. For example, a bit D/A converter has a complexity factor and cost proportional to $2^9$ while an 8 bit D/A converter has a complexity factor and cost proportional to $2^8$. Thus a reduction of one bit in the bandwidth resolution of a D/A converter reduces it's complexity with respect to the number of gates required, thereby considerably reducing the cost of the device.

Therefore a need exists for a method and apparatus for performing a modified quadrature modulation of a digital signal which reduces the required bit resolution of a D/A converter in a quadrature modulation circuit while still maintaining the bandwidth capacity of the D/A converter.

DETAILED DESCRIPTION OF THE DRAWINGS

Stated generally, a method and apparatus for producing phase reference signals for use in a quadrature modulation circuit are disclosed. The quadrature modulation circuit includes a signal splitter, a first and second signal conditioning circuit, a local oscillator and a combiner. The method includes the steps of converting, or splitting a digital signal stream in a splitter to produce a quadrature (Q) and in-phase (I) carrier signal. The quadrature (Q) and in-phase (I) carrier signal are then input into corresponding amplitude converters which produce corresponding amplitude samples, N bits wide. The method further includes the first amplitude converter providing a first sign information signal to a first phase modulator, the first sign information signal representative of an $N^{th}$ bit of an amplitude sample, N bits wide. The amplitude sample is derived from a quadrature (Q) phase carrier signal. In addition, the method includes the second amplitude converter providing a second sign information signal to a second phase modulator, the second sign information signal representative of an $N^{th}$ bit of an amplitude sample, N bits wide. The amplitude sample is derived from an in-phase (I) carrier signal. The method also includes a local oscillator generating a first and second phase reference signal, whereby the first phase reference signal is phase shifted ninety degrees from the second phase reference signal. Further, the method allows for modulating the first phase reference signal with the first sign information signal by the first phase modulator, producing a first modulated phase reference signal for use in a first mixer, and modulating the second phase reference signal with the second sign information signal by the second phase modulator, producing a second modulated phase reference signal for use in a second mixer. Finally the method includes combining a first and second modulated signal output from the first and second mixer in a combiner to form a resultant modulated signal which is subsequently transmitted as communication signal from a transmitting antenna.

The present invention also describes an apparatus for adjusting a local oscillator phase to produce a modified quadrature modulation. The apparatus includes a local oscillator for generating a first and second phase reference signal, the first reference signal shifted 90 degrees from the second reference signal. The apparatus also includes a first phase modulator having as input the first phase reference signal and a first sign information signal and outputting a first modulated phase reference signal, and a second phase modulator having as input the second phase reference signal and a second sign information signal and outputting a second modulated phase reference signal.

Figure 1:
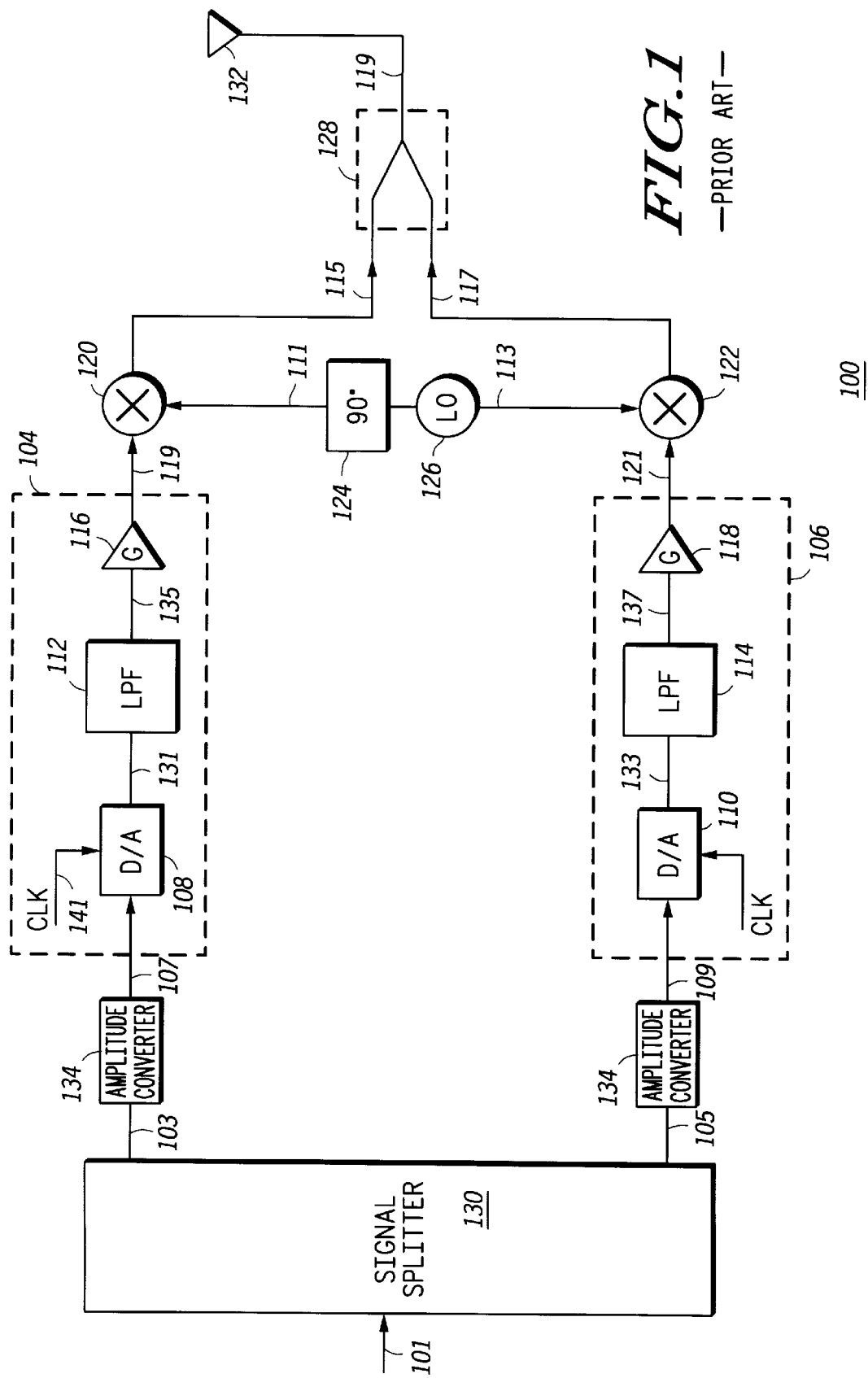
FIG. 1 is a block diagram of an up-converter circuit used for performing a prior art quadrature modulation of a digital signal.

Referring to FIG. 1, there is shown a block diagram of an up-converter circuit 100 used for performing a prior art quadrature modulation of a digital signal. An up-converter in a CDMA mobile station transmission path is used to illustrate circuit 100. A digital signal stream 101 enters a signal splitter 130 which converts, or splits, digital signal stream 101 into two corresponding component signals commonly referred to as a quadrature (Q) phase and an in-phase (I) component. Signal splitter 130 provides a mapping function whereby incoming bits of digital signal stream 101 are mapped into information that represents a baseband version of a resultant modulated output signal. Thus, operation of signal splitter 130 yields an in-phase (I) component signal 105 and quadrature (Q) phase component signal 103 which is representative of a real and imaginary component of digital signal stream 101. Although digital signal stream 101 may be from any suitable digital data source, it is shown in FIG. 1 as an output from a spreader block (discussed in connection with FIG. 4) in a signal transmission path.

Quadrature (Q) phase component signal 103 is input to an amplitude converter 134 which converts quadrature (Q) phase component signal 103 to amplitude samples, N bits wide. An amplitude sample 107 includes an $N^{th}$ bit which indicates whether Q phase component signal 103 was positive or negative at the time the amplitude sample was created. The $N^{th}$ bit may be referred to as a sign information signal. The remaining bits of the amplitude sample, designated as bits N-1 to end, are indicative of the magnitude of Q phase component signal 103 over the time frame of the sample. The bits N-1 to end may be referred to as magnitude information signal. Likewise, in-phase (I) component signal 105 is input into an amplitude converter 136 which converts in-phase (I) component signal 105 to amplitude samples, for example, amplitude sample 109, N bits wide.

All of the information contained in amplitude sample 107 is routed to a signal conditioning circuit 104 which includes a digital-to-analog (D/A) converter 108, a low pass filter (LPF) 112, and a gain adjuster 116. Generally speaking, signal conditioning circuit 104 filters and increases the gain of amplitude sample 107 such that it's modulation capability is optimized. Amplitude sample 107 is converted from a digital signal stream to an analog stream 131 by D/A converter 108.

A clock input 141 to D/A converter 108 guarantees that the analog signal being created by D/A converter 108 is created with a known frequency response, dictated by the clock rate and known sampling theories. Further, clock input 141 guarantees that the conversion process is substantially synchronized with the data generation process provided by signal splitter 130 and amplitude converters 134 and 136 for quadrature (Q) phase signal 103 and in-phase (I) carrier signal 105, respectively. A resultant transmitted signal is created with sufficient accuracy to meet design constraints. The signal accuracy is exponentially proportional to the number of bits, or bit resolution, in D/A converters 108 and 110; the precision of representation is proportional to $\frac{1}{2}^n$, the smallest available amplitude sample from D/A converters 108 and 110. Analog signal 131 is filtered in LPF 112 to remove extraneous images of Q phase component signal 103, the extraneous images resulting from the sampling process. LPF 112 outputs a filtered analog stream 135 which is then gain adjusted in gain adjuster 116 to produce a magnitude conditioned signal 119, suitable for mixing and/or modulating. Similarly, amplitude sample 109 is converted from a digital signal stream to an analog stream 133 by a D/A converter 110. Analog signal 133 is filtered in a LPF 114 to remove extraneous images of I phase component signal 105, the extraneous images resulting from the sampling process. LPF 114 outputs a filtered analog stream 137 which is then gain adjusted in a gain adjuster 118 to produce a magnitude conditioned signal 121, suitable for mixing and/or modulating.

A local oscillator 126 generates a reference frequency, synchronized to an external frequency reference. The reference frequency is composed of two components, offset by 90 degrees. The first component is a sine component of the reference frequency herein referred to as first reference phase signal 111. The second component is a cosine component of the reference frequency herein referred to as a second reference phase signal 113. First reference phase signal 111 is directed towards a mixer 120 which receives magnitude conditioned signal 119 resulting from quadrature (Q) phase component signal 103. Likewise, second reference signal 113 is directed toward a mixer 122 which receives magnitude conditioned signal 121 resulting from in-phase (1) component signal 105. Mixers 120 and 122 acts as a frequency converters by "mixing" a signal such as first reference phase signal 111 with another signal such as magnitude conditioned signal 119, to produce a desired output signal.

As shown in FIG. 1, mixer 120 mixes first reference phase signal 111 with magnitude conditioned signal 119, to produce a modulated signal 115, and mixer 122 mixes second reference phase signal 113 with magnitude conditioned signal 121 to produce a modulated signal 117. Modulated signals 115 and 117 are combined in a combiner 128 to form an up converted signal 119, which is transmitted via an antenna 132. The required bit resolution of D/A converters 108 and 110 is equivalent to the number of bits resulting from amplitude converters 134 and 136. As previously discussed, a digital amplitude sample N bits wide, such as amplitude sample 107, requires the use of a D/A converter with a bit resolution suitable to receive all N bits. A decrease in the required bit resolution of D/A converters would result is a significant cost savings as the complexity with respect to the number of gates required would be reduced exponentially.

Figure 2:
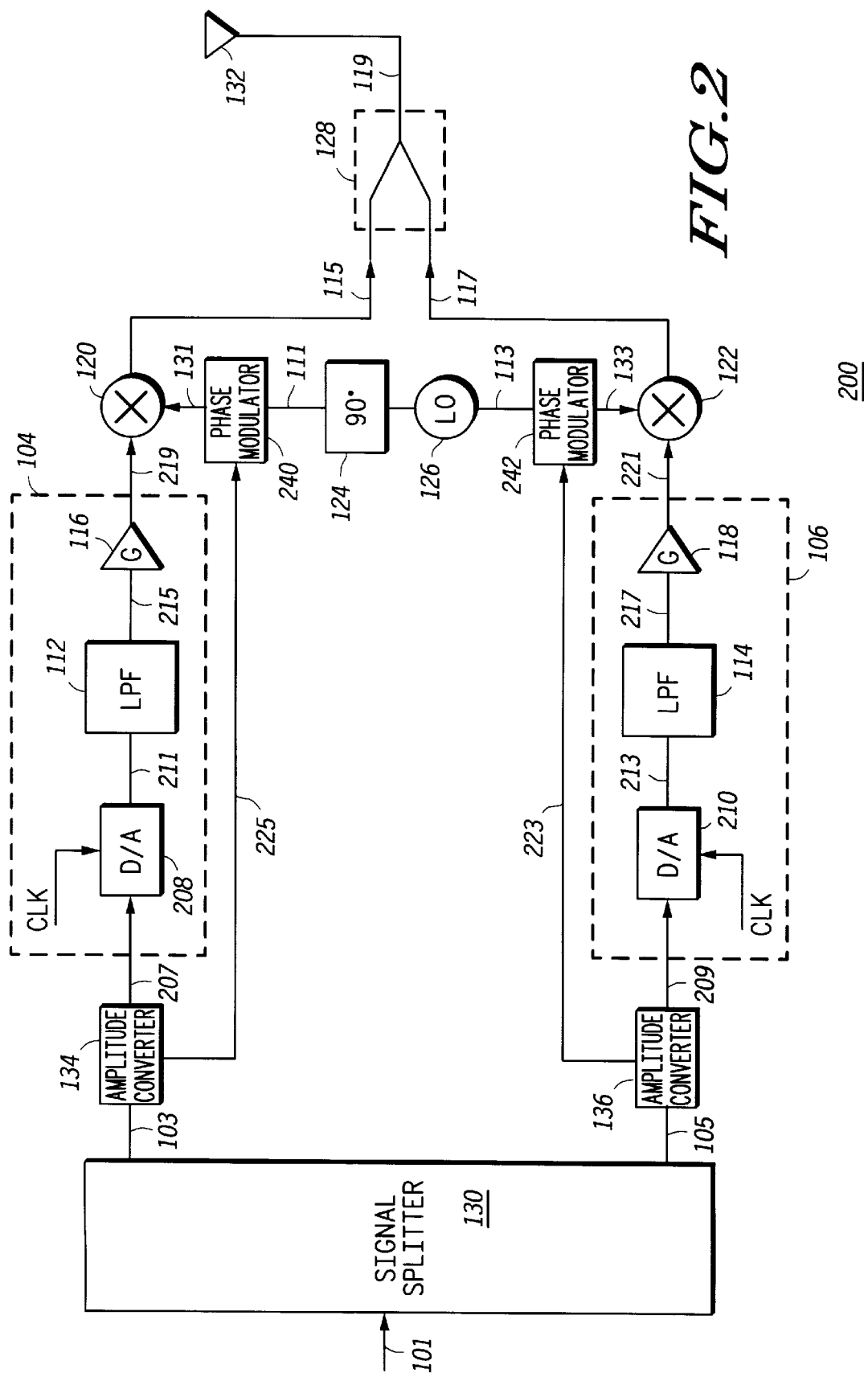
FIG. 2 is the up-converter circuit as shown in FIG. 1, further illustrating a method and apparatus for producing phase reference signals for use in a modified quadrature modulation in accordance with a preferred embodiment of the present invention.

FIG. 2 is the up-converter circuit as shown in FIG. 1, further illustrating a method and apparatus for producing phase reference signals for use in a modified quadrature modulation in accordance with a preferred embodiment of the present invention. Generally speaking, a modification to the circuitry associated with the generation of the sine and cosine local oscillator components is used to decrease the required bit resolution of the D/A converters by one bit, thereby resulting in a significant power and cost reduction to the signal conditioning circuitry without decreasing transmission accuracy.

The preferred embodiment depicted in FIG. 2 requires an addition of a phase modulator in each of the local oscillator component paths. The preferred embodiment also requires a first sign information signal 223 and a second sign information signal 225 from corresponding amplitude converters 134 and 136 to be separated from their corresponding magnitude information signals 207 and 209. First and second sign information signals 225 and 223 are representative of a sign bit output from first and second amplitude converters 134 and 136. First and second magnitude information signals 207 and 209 are representative of magnitude information bits output from first and second amplitude converters 134 and 136.

First sign information signal 223 and second sign information signal 225 are then routed to corresponding first phase modulator 240 and second phase modulator 242, rather than to D/A converters 208 and 210. The resulting output from first phase modulator 240 herein referred to as a first phase modulated phase reference signal 131 is input to mixer 120. Mixer 120 mixes a first phase modulated phase reference signal 131 with a magnitude conditioned signal 219, to produce a modulated signal 115. Similarly, the resulting output from second phase modulator 242 herein referred to as a second phase modulated phase reference signal 133 is input to mixer 122. Mixer 122 mixes a second phase modulated phase reference signal 133 with a magnitude conditioned signal 221, to produce a modulated signal 117.

The use of the sign information signal to perform a phase change of 180 degrees on first and second reference phase signals 111 and 113, frees signal conditioning circuitry 104 and 106 to perform only amplitude changes on the signal. Also, the inversion function provided by the routing of the sign information signal may be incorporated into digital circuitry to generate appropriately phased local oscillator signals, depending upon the incoming magnitude information signal. The separation of the magnitude and phase information in the signal conditioning circuitry removes one bit of information originally needed to provide full modulation capability. The removal of the sign information signal from the input to the signal conditioning circuit decreases the cost of the associated D/A converter and only adds an inversion function, via the phase modulator, to the local oscillator circuitry.

Figure 3:
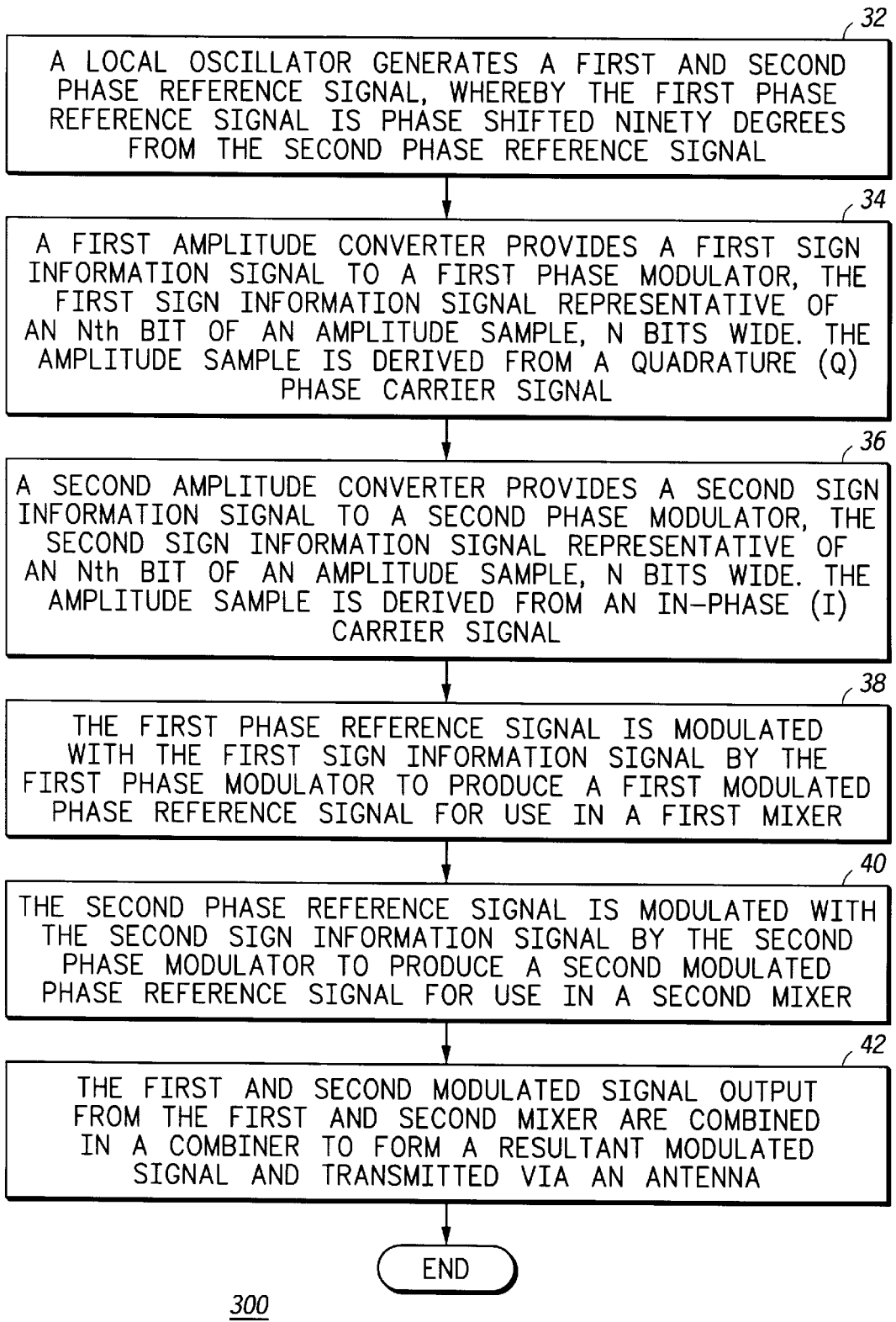
FIG. 3 is a flow chart illustrating those steps necessary for producing phase reference signals for use in a modified quadrature modulation in accordance with the preferred embodiment of the present invention.

FIG. 3 is a flow chart of a method 300, for producing phase reference signals for use in a modified quadrature modulation in accordance with the preferred embodiment of the present invention. The method starts at step 32 where a local oscillator 126 generates a first and second phase reference signal 111 and 113. The first phase reference signal 111 is phase shifted ninety degrees from the second phase reference signal 113.

At step 34, a first amplitude converter 134 provides a first sign information signal 225 to a first phase modulator 240. An quadrature phase (Q) carrier signal 103 which resulted from a signal splitter 130, serves as an input to first amplitude converter 134. Prior to providing first sign information signal 225 to first phase modulator 240, first amplitude converter 134 receives quadrature phase (Q) carrier signal 103 and converts it to a first series of amplitude samples N bits wide. The first series of amplitude samples, N bits wide, includes an $N^{th}$ bit signifying a corresponding first sign information signal 225 and a series of less than or equal to N-1 bits, signifying a magnitude information signal 207. Similarly, a second amplitude converter 136 provides a second sign information signal 223 to a second phase modulator 242, at step 36. An in-phase (I) carrier signal 105 which resulted from a signal splitter 130, serves as an input to second amplitude converter 136. Prior to providing second sign information signal 223 to second phase modulator 242, second amplitude converter 136 receives in-phase (I) carrier signal 105 and converts it to a second series of amplitude samples N bits wide. The second series of amplitude samples, N bits wide, includes an $N^{th}$ bit signifying a corresponding second sign information signal 223 and a series of less than or equal to N-1 bits, signifying a magnitude information signal 209.

Next, at step 38, the first phase reference signal 111 is modulated by the first phase modulator 240 to produce a first modulated phase reference signal 131. The first phase reference signal 111 is modulated with the first sign information signal 225. The first phase reference signal 111 is mixed with a first magnitude conditioned signal 219 to produce a first modulated signal 115 output from a first signal conditioning circuit 104 which received as input the magnitude information signal 207 associated with the first series of amplitude samples.

Similarly, the second phase reference signal 113 is modulated by the second phase modulator 242 to produce a second phase modulated phase reference signal 133, at step 40. The second phase reference signal 113 is modulated with the second sign information signal 223.

The second phase reference signal 113 is mixed with a second magnitude conditioned signal 221 to produce a second modulated signal 117 output from a second signal conditioning circuit 106 which received as input the magnitude information signal 209 associated with the second series of amplitude samples. Finally, the first and second modulated signals are combined in a combiner 128 to form a resultant modulated signal 119 and transmitted via an antenna 132, at step 42.

Figure 4:
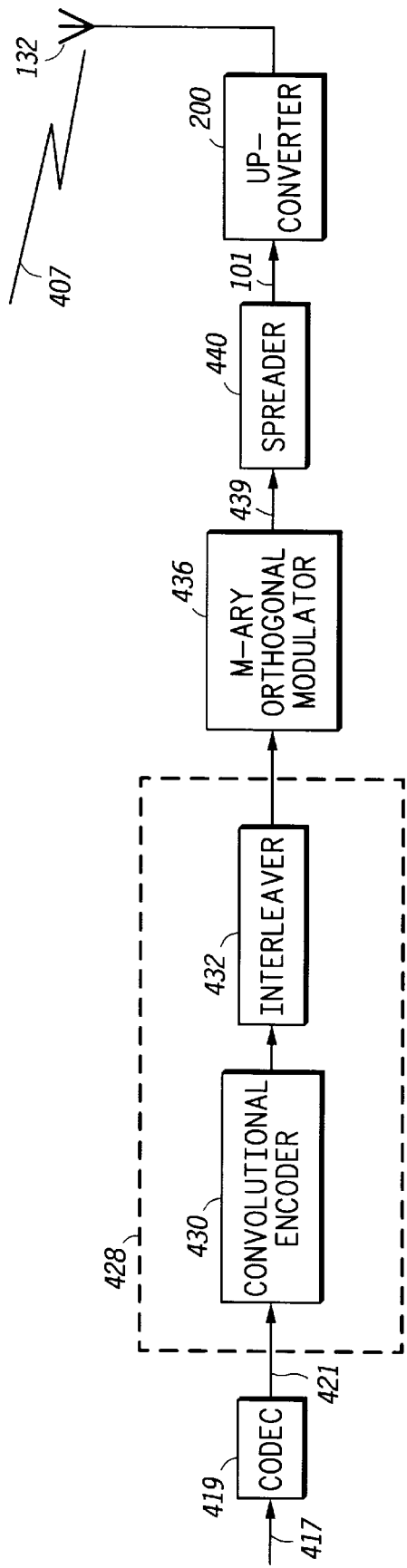
FIG. 4 is a block diagram of a transmitter 400 for use in a mobile station, transmitter 400 incorporating the up-converter circuit of FIG. 2.

High-amplitude sample rate digital radios such as a CDMA mobile station transmitters and receivers, are known in the art. FIG. 4 is a block diagram of a transmitter 400 for use in a mobile station, which incorporates the circuit of FIG. 3. A data bit stream 417, which may be voice, video or another type of information, enters a variable-rate coder 419, which produces a signal 421 comprised of a series of transmit channel frames having varying transmit data rates. The data rate of each frame depends on the characteristics of data bit stream 417.

Encoder block 428 includes a convolutional encoder 430 and an interleaver 432. At convolutional encoder 430, the transmit channel frame may be encoded by a rate ⅓ encoder using well known algorithms such as convolutional encoding algorithms which facilitate subsequent decoding of the frames. Interleaver 432 operates to shuffle the contents of the frames using commonly known techniques such as block interleaving techniques. Each frame of digitally coded and interleaved bits includes ninety-six groups of six coded bits, for a total of 576 bits. Each group of six coded bits represents an index to one of sixty-four symbols such as Walsh code symbols. A Walsh code symbol corresponds to a single row or column of a sixty-four-by-sixty-four Hadamard matrix, a square matrix of bits with a dimension that is a power of two. Typically, the bits comprising a Walsh code symbol are referred to as Walsh chips.

Each of the ninety-six Walsh code indices in the frames output from interleaver 432 are input to an M-ary orthogonal modulator 436, which is preferably a sixty-four-ary orthogonal modulator. For each input Walsh code index, M-ary orthogonal modulator 436 generates, a corresponding sixty-four-chip Walsh symbol. Thus, a series of ninety-six, sixty-four-chip Walsh symbols are generated for each frame input to M-ary orthogonal modulator 436, and are based on the input bit stream. M-ary orthogonal modulator 436 then selects, via a correlation algorithm, a Walsh code output 439 which is highly likely to be representative of the bit stream.

Spreader block 440, among other things, applies a pseudorandom noise (PN) sequence to the series of Walsh code outputs 439 using well-known scrambling techniques. Typically, in DS-CDMA, spreader block 440 spreads the series of Walsh symbols using a mobile unique PN sequence to yield a digital signal stream 101 as an output.

An up-converter circuit 200, performs a modified quadrature modulation of digital signal stream 101 according to the preferred embodiment described in connection with FIG. 2. Digital signal stream 101 enters a signal splitter which converts, or splits digital signal stream 101 into a quadrature (Q) and in-phase (I) carrier signal. The quadrature (Q) and in-phase (I) carrier signal are then input into corresponding amplitude converters which produce corresponding amplitude samples, N bits wide. The first amplitude converter then provides a first sign information signal to a first phase modulator, the first sign information signal representative of an $N^{th}$ bit of an amplitude sample, N bits wide. The amplitude sample is derived from a quadrature (Q) phase carrier signal. The second amplitude converter then provides a second sign information signal to a second phase modulator, the second sign information signal representative of an $N^{th}$ bit of an amplitude sample, N bits wide. The amplitude sample is derived from an in-phase (I) carrier signal. A local oscillator generates a first and second phase reference signal, whereby the first phase reference signal is phase shifted ninety degrees from the second phase reference signal. The first phase reference signal is modulated with the first sign information signal by the first phase modulator, to produce a first modulated phase reference signal for use in a first mixer. The second phase reference signal is modulated with the second sign information signal by the second phase modulator, to produce a second modulated phase reference signal for use in a second mixer. Finally, a first and second modulated signal output from the first and second mixer are combined in a combiner to form a resultant modulated signal 119 which is subsequently transmitted as communication signal 407 from a transmitting antenna 132.

While the invention has been particularly shown and described with reference to a particular embodiment, it will be understood by those skilled in the art that various changes in form and details may be made therein without departing from the spirit and scope of the invention.

What is claimed is:

1. A method for modulation within a communication system, the method comprising the steps of:
   receiving a digital sample comprising N bits, wherein a sign bit comprises positive or negative sign information for the digital sample and the remaining bits comprise magnitude information bits for the digital sample;
   separating the sign bit from the digital sample;
   routing the sign bit to a first phase modulator while bypassing a digital to analog (D/A) converter to produce a phase modulated signal, wherein the phase modulated signal comprises a phase based on the sign bit;
   routing the magnitude information bits through a D/A converter to produce an analog signal; and
   mixing the phase modulated signal with the analog signal.

2. The method of claim 1 further comprising the steps of:
   receiving a second digital sample comprising N bits, wherein a second single sign bit comprises positive or negative sign information for the second digital sample and the remaining bits comprise second magnitude information bits of the second digital sample;
   separating the second sign bit from the second digital sample;
   routing the second sign bit to a second phase modulator while bypassing a second digital to analog (D/A) converter to produce a second phase modulated signal, wherein the second phase modulated signal comprises a second phase based on the second sign bit;
   routing the second magnitude information bits through the second D/A converter to produce a second analog signal; and
   mixing the second phase modulated signal with the second analog signal.

3. The method of claim 1 wherein the step of receiving the digital sample comprises the step of receiving an in-phase (I) digital sample.

4. The method of claim 1 wherein the step of receiving the digital sample comprises the step of receiving an in-phase (I) digital sample, and the step of receiving the second digital sample comprises the step of receiving a quadrature (Q) digital sample.

5. An apparatus for modulating a signal, the apparatus comprising:
   an first amplitude converter having a first digital sample comprising N bits as an input, and outputting a first sign bit comprising positive or negative sign information for the first digital sample, wherein the first amplitude converter additionally outputs first magnitude information bits for the first digital sample;
   a first phase modulator having the first sign bit as an input and outputting a first phase modulated signal, wherein the first phase modulated signal comprises a first phase based on the first sign bit;
   a first digital to analog (D/A) converter having the first magnitude information bits as an input and outputting a first analog signal with an amplitude based on the first magnitude information bits; and
   a first mixer having the first phase modulated signal and the first analog signal as inputs and outputting a signal based on a mixing of the first phase modulated signal and the first analog signal.

6. The apparatus of claim 4 further comprising:
   an second amplitude converter having a second digital sample comprising N bits as an input, and outputting a second sign bit comprising positive or negative sign information for the second digital sample, wherein the second amplitude converter additionally outputs second magnitude information bits for the second digital sample;
   a second phase modulator having the second sign bit as an input and outputting a second phase modulated signal, wherein the second phase modulated signal comprises a second phase based on the second sign bit;
   a second digital to analog (D/A) converter having the second magnitude information bits as an input and outputting a second analog signal with an amplitude based on the second magnitude information bits; and a second mixer having the second phase modulated signal and the second analog signal as inputs and outputting a signal based on a mixing of the second phase modulated signal and the second analog signal.

7. The apparatus of claim 4 wherein the first digital sample comprises an in-phase (I) digital sample.

8. The apparatus of claim 5 wherein the first digital sample comprises an in-phase (I) digital sample and the second digital sample comprises a quadrature (Q) digital sample.

* * * * *